United States Patent Office 2,993,830
Patented July 25, 1961

2,993,830
EMULSIFYING COMPOSITIONS
Walter Hagge and Mathieu Quaedvlieg, Leverkusen-Bayerwerk, Günther Boehmke, Koln-Mulheim, and Herbert Hempel, Koln-Stammheim, Germany, assignors to Farbenfabriken Bayer Aktiengesellschaft, Leverkusen, Germany, a corporation of Germany
No Drawing. Filed July 24, 1958, Ser. No. 750,569
Claims priority, application Germany July 25, 1957
3 Claims. (Cl. 167—42)

The present invention relates to emulsifying compositions; more particularly it concerns emulsifying compositions which contain polyglycol ethers of phenols substituted by hydrocarbon radicals as well as salts of sulfonic acids of phenols which are etherified and substituted by hydrocarbon radicals.

Polyglycol ethers of phenols substituted by hydrocarbon radicals are, for example, those obtainable by reacting phenols which are substituted by aliphatic, cycloaliphatic, aromatic or araliphatic hydrocarbon radicals with alkylene oxides such as ethylene oxide and/or propylene oxide or butylene oxide. Preferably those polyglycol ethers are to be considered which are obtainable by alkoxylating condensation products from phenol or hydroxydiphenyl and styrene, α-methyl-styrene, vinyltoluene or divinylbenzene in the presence of alkaline catalysts, for example according to the instructions of German patent specification No. 824,949, Belgian patent specification No. 563,590 or co-pending U.S. patent application Ser. No. 693,005 filed October 10, 1957 by Mathieu Quaedvlieg, Herbert Hempel and Günther Boehmke.

It is expedient to use as component for the compositions of the invention phenolpolyglycol ethers substituted by hydrocarbon radicals in which the polyglycol ether radical and the hydrocarbon radical are adjusted to one another, so that in the case of a substitution by hydrocarbon radicals having up to about 10 carbon atoms there are present 8–10 hydroxyalkyl groups, and in the case of a substitution by hydrocarbon radicals with more than 10 carbon atoms, about 10–20 hydroxyalkyl groups.

With regard to the salts of sulfonic acids of phenols etherified and substituted by hydrocarbon radicals, there may be mentioned as compounds which may have served for the etherification of the phenols, aliphatic alcohols, particularly those containing up to 8 carbon atoms such as methyl or ethyl alcohol, aromatic alcohols and also phenols as well as the substitution products of these compounds, for example their halogenation products such as 2-chlorethyl alcohol; as hydrocarbon radicals there may be considered for the substitution of the sulfonic acids of the phenol ethers alkyl, cycloalkyl, aryl and aralkyl radicals; they preferably contain at least 6 carbon atoms each in the case of a monosubstitution and at least 4 carbon atoms each in the case of a disubstitution.

Suitable phenols on which the sulfonic acids may be based are, for example, diisobutyl, nonyl, dinonyl, isododecyl and oleylphenol, furthermore isohexylxylenol, di- and tri-phenyl ethylphenol, phenylethyl pyrocatechol, iso-octyl-resorcinol and isohexyl naphthol. As salts there may be used with particular advantage, in addition to alkali metal and ammonium salts and the salts of organic bases, also calcium or magnesium salts.

The salts of the sulfonic acids of the phenol ethers are obtainable in various ways, for example by first preparing phenol ethers from alkali metal phenolates and alkylhalides, by then introducing hydrocarbon radicals, for example by condensation with unsaturated hydrocarbons such as isododecylene or styrene, and by subsequently sulfonating the substituted phenol ethers thus obtained; the salts of the sulfonic acids of the phenol ethers are also obtainable by first introducing the hydrocarbon radicals into phenol, then producing the ethers and, finally, sulfonating the same. The sulfonation is expediently carried out at ordinary temperature with approximately a 20 precent oleum or at about 60–110° C. with a 98–100 percent sulfuric acid, obviating, if possible, the formation of disulfonic acids. For the conversion of the free sulfonic acids of the phenol ethers which are soluble in water, alcohol and oil, into their salts, the neutralisation of the sulfonic acids when using alkaline earth metal hydroxides or carbonates is advantageously not effected in water, but in an organic solvent, for example a mixture of methanol and toluene or xylene, without preliminary purification, since in this case the excess sulfuric acid can be separated in the form of alkaline earth metal sulfates; if alkali metal or amine salts are to be produced, the excess sulfuric acid must be carefully removed or washed out before neutralisation. After the conversion of the sulfonic acids of the phenol ethers into their salts, inorganic constituents which may still be present should expediently be removed.

The proportions of the components of the emulsifying compositions may vary within wide limits between about 95–15 parts by weight of the phenolpolyglycol ether component and 5–85 parts by weight of the phenol ether sulfonate component. A ratio of 60 parts by weight of the polyglycol ether component to 40 parts by weight of the phenol ether sulfonate component has generally proved to be advantageous. The two components are advantageously mixed with the use of an easily removable solvent; as solvents there may be mentioned readily volatile alcohols, ketones and also solvent mixtures such as are used for example for the neutralisation of the sulfonic acids of the phenol ethers, i.e. mixtures of methanol with toluene or xylene.

The emulsifying compositons of the present invention can be used for emulsifying a great variety of substances difficultly soluble or insoluble in water; with particular advantage they can be applied for emulsifying biocides in water, especially those based on phosphoric acids or thiophosphoric acids. The expedient quantities or proportions of the phenolpolyglycol ether component and the phenol ether sulfonate component to be used depend, apart from the components themselves, also on the nature and quantity of the biocides and also on the type and quantity of the solvent used for the formulation of the biocides; however, the optimum conditions may easily be ascertained in each case by preliminary tests; in general about 5–15 percent of the proposed mixtures, referred to the mixture of the biocide and the solvent to be emulsified, will be sufficient.

Further details as to practicing the invention are apparent from the following examples, the parts being by weight. The examples also contain further instructions for the preparation of the phenolpolyglycol ethers or phenol ether sulfonates.

*Example 1*

54 parts of the phenolpolyglycol ether component described below under (a) and 36 parts of the phenol ether sulfonate component described below under (b) are intimately mixed with 10 parts of butanol, methylcyclohexanol or water. 12 parts of the emulsifier mixture thus obtained are added to a biocide prepared from 50 parts of p-nitrophenylthiophosphoric acid diethyl ester, 35 parts of xylene and 3 parts of butanol. The biocide can then easily be dispersed in water and forms immediately a stable aqueous emulsion, even at a high dilution.

When using as emulsifier the phenolpolyglycol ether mentioned under (a) or the phenol ether sulfonate mentioned under (b) alone the threefold amount is required in each case to obtain the same result.

(a) The phenolpolyglycol ether component is obtainable by condensing in known manner 94 parts of phenol with 260 parts of styrene in the presence of sulfuric acid as a catalyst and by then reacting the condensation product with 660 parts of ethylene oxide with the addition of potassium hydroxide according to the instructions given in Example 3 of U.S. Patent application Ser. No. 693,005.

(b) The phenol ether sulfonate component is obtainable by condensing 122 parts of phenylethyl ether at 140° C. with the addition of 2 parts of a 50 percent sulfuric acid with 177 parts of styrene; the reaction mixture thus obtained is then heated with 110 parts of 100 percent sulfuric acid to 70–90° C. for 5 hours, the clear water-soluble sulfonation product is treated with 400 parts of a mixture of equal parts of methanol and xylene, and neutralised with calcium carbonate or calcium hydroxide. The solution is then filtered off with suction from the insoluble salts formed (mainly calcium sulfate) and the solvents are removed under vacuum.

Instead of mixing the components (a) and (b) in the manner described in the first paragraph of this example, it is also possible to proceed in such a manner as to treat the solution mentioned under (b) after filtering off with suction from the insoluble salts and ascertaining its content of the phenol ether sulphonate component, with the corresponding amount of the phenolpolyglycol ether component (a) and then to remove the solvents under vacuum.

*Example 2*

54 parts of the phenol ether component mentioned in Example 1 under (a) and 36 parts of the phenol ether sulfonate component described below are intimately mixed with 10 parts of butanol, methylcyclohexanol or water. 10 parts of the emulsifier mixture thus obtained are added to a biocide consisting of 50 parts of p-nitrophenylthiophosphoric acid diethyl ester and 40 parts of xylene. The biocide can then easily be dispersed in water and forms immediately a stable aqueous emulsion even at a high dilution.

The phenol ether sulfonate component is obtainable as follows:

100 parts of a condensation product prepared in known manner from 100 parts of butylphenol ether and 117 parts of styrene are treated with 100 parts of a 20 percent oleum at 30–40° C., until the condensation product has become water-soluble. 15–20 parts of water are then added and the separated excess sulfuric acid is removed. The remaining upper layer is treated with the three-fold amount of water or methanol, neutralised with calcium carbonate and filtered. The clear solution thus obtained is then evaporated to dryness under vacuum.

*Example 3*

54 parts of the phenolpolyglycol ether component mentioned in Example 1 under (a) and 36 parts of the phenol ether sulfonate component described below are intimately mixed with 10 parts of methylcyclohexanol. 10 parts of the emulsifier mixture thus obtained are added to a biocide consisting of 50 parts of p-nitrophenyl-thiophosphoric acid dimethyl ester and 40 parts of xylene. The biocide can then easily be dispersed in water and immediately forms a stable aqueous emulsion even at a high dilution.

The phenol ether sulfonate component used is obtainable in the following manner:

100 parts of a product obtainable in known manner by condensation of 156 parts of phenoxyethyl chloride with 177 parts of styrene, are treated with 50 parts of a 100 percent sulfuric acid at 60° C., until the reaction product dissolves clearly in water. The reaction product is then treated with 450 parts of water or with the equal amount of the above mentioned solvents and, after separating off the excess sulfuric acid, neutralised with calcium carbonate. The solution obtained after filtering off is evaporated to dryness.

We claim:

1. An emulsifying composition which contains (1) polyglycol ethers of phenol substituted 1–3 times in the benzene ring by hydrocarbon radicals containing altogether 4–24 carbon atoms, the number of recurring oxyethylene units being from 8–20, and (2) salts of sulfonic acids of phenols which are substituted 1–3 times by hydrocarbon radicals containing altogether 4–24 carbon atoms and which are etherified by compounds containing 1–8 carbon atoms and having only one hydroxyl group, the phenols substituted by sulfonic acid groups being selected from the group consisting of phenol, pyrocatechol, resorcinol and naphthol.

2. A composition containing the emulsifying composition of claim 1 and a biocide.

3. The emulsifying composition of claim 1 and a biocide selected from the group consisting of p-nitrophenyl-thiophosphoric acid dimethyl ester and p-nitrophenyl-thiophosphoric acid diethyl ester.

References Cited in the file of this patent

UNITED STATES PATENTS

| | | |
|---|---|---|
| 2,213,477 | Steindorff et al. | Sept. 3, 1940 |
| 2,616,930 | Schmerling | Nov. 4, 1952 |
| 2,624,706 | Maxcy et al. | Jan. 6, 1953 |
| 2,630,457 | Hansen et al. | Mar. 3, 1953 |
| 2,679,508 | Gysin | May 25, 1954 |
| 2,692,877 | Gray et al. | Oct. 26, 1954 |
| 2,759,867 | Melass | Aug. 21, 1956 |
| 2,845,380 | Mayhew et al. | July 29, 1958 |